United States Patent [19]

Tou

[11] Patent Number: 5,384,702
[45] Date of Patent: Jan. 24, 1995

[54] METHOD FOR SELF-CORRECTION OF GRAMMAR IN MACHINE TRANSLATION

[76] Inventor: Julius T. Tou, 2046 NW. 14th Ave., Gainesville, Fla. 32605

[21] Appl. No.: 122,253

[22] Filed: Sep. 19, 1993

[51] Int. Cl.6 .............................................. G06F 15/38
[52] U.S. Cl. ............................ 364/419.08; 364/419.02
[58] Field of Search .................... 364/419.08, 419.02, 364/419.01, 419.04, 419.05, 419.06

[56] References Cited

U.S. PATENT DOCUMENTS

| | | | |
|---|---|---|---|
| 4,954,984 | 9/1990 | Kaijima et al. | 364/419.05 |
| 4,958,285 | 9/1990 | Tominaga | 364/419.08 |
| 4,964,044 | 10/1990 | Kumano et al. | 364/419.06 |
| 4,980,829 | 12/1990 | Okajima et al. | 364/419.05 |
| 4,994,966 | 2/1991 | Hutchins | 364/419.08 |
| 5,101,349 | 3/1992 | Tokuume et al. | 364/419.08 |
| 5,224,040 | 6/1993 | Tou | 364/419.02 |
| 5,289,375 | 2/1994 | Fukumochi et al. | 364/419.02 |

Primary Examiner—Robert A. Weinhardt
Attorney, Agent, or Firm—Joseph C. Mason, Jr.; Ronald E. Smith

[57] ABSTRACT

Sentences from a source language having first rules of grammar are translated into a target language having second rules of grammar; the resulting sentences are meaningful but ungrammatical. The ungrammatical sentences are changed into grammatical sentences by a method that includes identifying grammar markers and grammar marker patterns in the translated put ungrammatical sentence. A first database includes grammar rules and is consulted for each grammar marker that appears in the ungrammatical sentence. A second database includes self-correction rules and is consulted for each grammar marker pattern that appears. The grammar rules and self-correction rules are applied by a correction scheme. The resulting sentences are substantially perfectly grammatical.

40 Claims, 2 Drawing Sheets

METHOD FOR SELF-CORRECTION OF GRAMMAR IN MACHINE TRANSLATION

BACKGROUND OF THE INVENTION

1. Field of the Invention

This invention relates, generally, to methods for improving the grammar of the final translation of a machine-translated sentence.

2. Description of the Prior Art

Different languages follow different rules of grammar. Thus, a sentence that is perfectly grammatical in the sentence to be translated, i.e., the source language, may become ungrammatical after translation into the target language if the translator does not apply all of the grammatical rules of the target language.

Thus, when machine translation is performed, the machine must know the grammatical rules of the source language and the target language if the final translation is to be grammatically correct. However, the rules of grammar are so vast that heretofore it has been the conventional wisdom that machine translations will always be somewhat less than grammatically perfect.

Research groups in the United States, Japan, the Peoples Republic of China (mainland China), the Republic of China (Taiwan), Canada, Singapore, and Hong Kong have been working for about thirty five years on the problem of translating Chinese into English and other target languages. About four different categories of translation sophistication have been achieved.

In Category 1, each Chinese character in a Chinese sentence is translated into its equivalent word in the target language; the result, as is well-known, can be and usually is nonsensical.

Category 2 devices produce pidgin English, a fractured language that can be understood by English speakers but which is replete with awkward and unusual expressions. Thus, the translation is much better than the translation produced by a Category 1 device, but it is still unacceptable because it requires that the user of the sentence complete the translation by amending it as required by the rules of English grammar and syntax.

Category 3 devices simply pre-store refined English sentences in a memory and reproduce said stored sentences upon recognition of a Chinese sentence having the same meaning. These systems may be used to convert entries in a Chinese menu into refined English, to convert very often-repeated Chinese expressions into refined English, and the like. Thus, they have some utility to travelers and students having a very rudimentary need for translations, but they are impractical as general use translation machines because every language contains practically an infinity of different sentences, of course.

The CITAC machine translator, disclosed by the present inventor in U.S. Pat. No. 5,224,040, entitled "Method For Translating Chinese Sentences," and the present invention are Category 4 devices in that they are general use translation machines which provide meaningful, non-pidgin-type translations and refined, grammatically correct sentences, respectively.

At the time the present invention was made, it was not obvious to those of ordinary skill in this art how improved Category 4 machines could be made, in view of the prior art considered as a whole.

SUMMARY OF THE INVENTION

This invention begins where the earlier invention by the same inventor ended. More particularly, in the above-mentioned patent, a machine and method are disclosed that provide the world's first meaningful translation of Chinese into a target language. In sharp and distinctive contrast to earlier machines for translating Chinese into a target language, said earlier machine and method includes novel parts and methods for eliminating the nonsense words produced by prior art devices that attempted to translate Chinese words into a target language. The heart of that earlier invention is a highly novel method for detecting Chinese words from a string of Chinese characters; the method includes the steps of inputting the characters into a buffer so that various groupings thereof can be made until an authentic, meaningful word is detected. The final translation produced by that machine and method is meaningful in the target language and is free of nonsense words and pidgin English, but grammatical errors may appear therein because no means is provided for making a final, grammatically correct translation.

Thus, the present invention provides a novel method for changing the final translation produced by the earlier machine and method into a grammatically correct translation.

The heart of the present invention is the observation that elimination of grammatical mistakes at the translation level is extraordinarily difficult and impractical, and the discovery that grammatical errors are best corrected after a meaningful sentence has been produced by the translation process. Thus, the final product of the CITAC machine is the starting point for the novel grammar-correcting method disclosed herein.

The present invention is further based upon the discovery that sentences may be analyzed and found to contain grammar markers and grammar marker patterns. For example, a pronoun is assigned a grammar marker because it is susceptible to a variety of translations when rendered from Chinese to a target language. In written Chinese, which does not distinguish pronoun cases, a single character, pronounced "Wuh," may mean "I," "me," "my," or "mine"; another character, pronounced "Ni" may mean "you," "your," or "yours"; similarly, the word "Ta" may mean "he," "him," "his" "she," "her," or "hers." These ambiguities are not easily resolved by a machine because the written sentences to be translated do not distinguish between such pronoun cases as aforesaid.

Thus, when the earlier machine produces a sentence having an English pronoun (or a pronoun in any other target language that distinguishes between pronoun cases), the present machine associates the pronoun with a grammar marker. In other words, a "red flag" is raised because the presence of an English pronoun in the final sentence is an indication that the pronoun may be grammatically incorrect because the original written Chinese sentence, again, will not have provided the specific pronoun case that should be present in the final translation.

Similarly, Chinese does not distinguish between singular and plural nouns. Thus, a perfectly grammatical Chinese sentence may refer to "three book." Thus, the presence of a noun preceded by a number greater than one in the final translation again raises a "red flag," indicating that the final translation may be grammatically incorrect.

Numerous grammar markers and grammar marker patterns are employed in the present invention to alert the machine that further handling of the translated words are needed to provide a grammatically correct translation. When a grammar marker is encountered, the machine consults a first database to fetch the appropriate grammar rules that apply when those particular grammar markers are encountered. When a grammar marker pattern is encountered, the machine consults a second database to fetch the appropriate self-correction rules that apply when those particular grammar marker patterns are encountered. Said self-correction rules in said second database then execute the corrections that are needed. The result is a grammatically correct sentence in the target language.

It should be clear, then, that the present invention would not be needed where the grammatical rules of the source language were the same as the grammatical rules of the target language.

The primary object of this invention is to provide a method for producing grammatically correct sentences in a target language in those situations where the grammar rules of the source language do not match the grammar rules of the target language.

A more specific object is to disclose a method of associating certain words and word combinations in a translated sentence as grammar markers and grammar marker patterns, respectively, indicating that further steps may need to be taken to ensure a grammatically correct translation.

A related object is to disclose means that automatically makes the necessary corrections.

More particularly, it is an object of this invention to provide means for fetching appropriate grammar rules based upon the presence in a translated sentence of codes used as grammar markers, and means for fetching appropriate self-correction rules based upon the presence in said sentence of grammar marker patterns.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
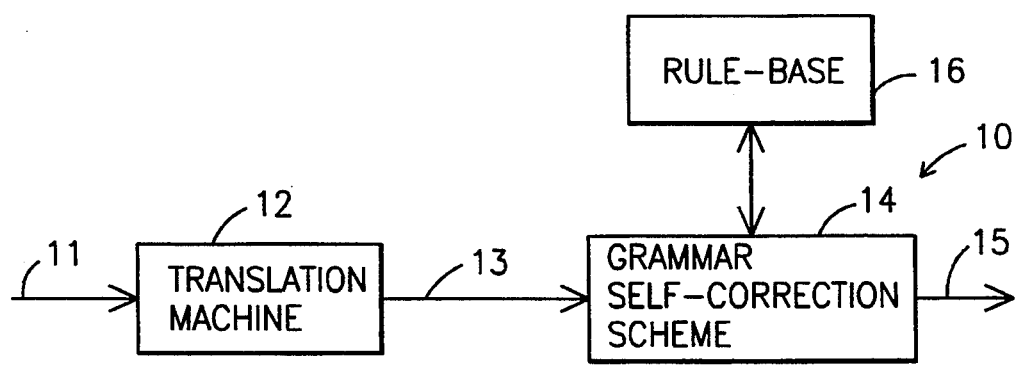
FIG. 1 is a block diagram providing an overview of how the novel method relates to the earlier machine and method provided by the same inventor.

Referring now to FIG. 1, it will there be seen that the combined systems of the earlier invention by the same inventor and the present invention are denoted by the reference numeral 10 as a whole. The translation machine of the first invention, to be known commercially as the CITAC translation machine, is denoted 12. It receives sentences in the source language as at 11 and produces a meaningful translation of those sentences into a target language as at 13, but the sentences may include grammatical errors. The disclosure filed Mar. 12, 1991, U.S. Ser. No. 07/667,944, by the present inventor, entitled "Method For Translating Chinese Sentences," now U.S. Pat. No. 5,224,040 is hereby incorporated by reference into this disclosure to provide the foundation for this disclosure. However, a full understanding of the present invention may be obtained from the present disclosure without making reference to the earlier disclosure.

The Grammar Self-correction Method of this invention is denoted 14; it is connected to rule base 16. The steps of the method 14 refine the product of the CITAC translation machine 12, i.e., sentences 13, into grammatically correct sentences 15 by making reference to the rule base 16. More particularly, the presence of grammar markers or grammar marker patterns in a sentence 13 is detected by the means in block 14 and triggers use of rule base 16 to produce the grammatically correct sentences 15. A collection of grammar markers with associated English words forms a grammar marker pattern.

Figure 2:
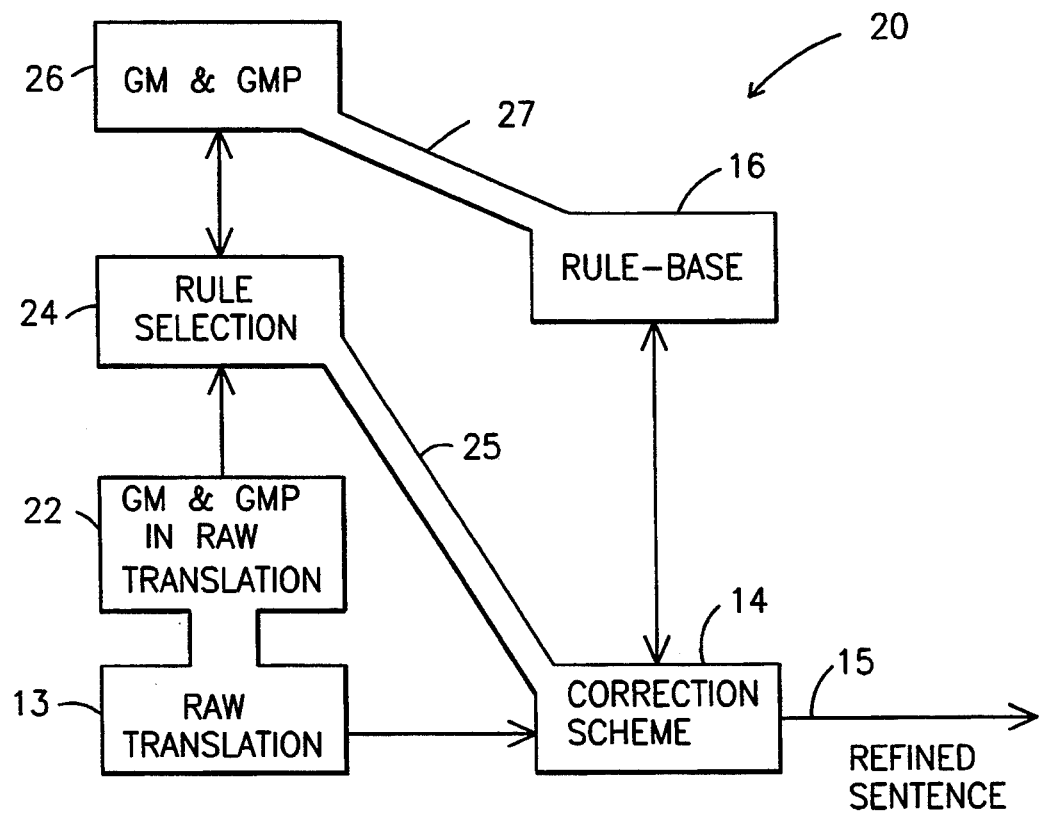
FIG. 2 is a block diagram showing the system architecture for the grammar self-correction method of this invention.

A more detailed look at the system architecture is provided in FIG. 2; the system architecture is denoted 20 as a whole. The meaningful but possibly grammatically incorrect sentences 13 are called a "raw translation." The grammatically correct sentence 15 is referred to as a "refined sentence," indicating the substantial absence of grammatical errors therein. The grammar markers and the grammer marker patterns in the raw translation 13 are denoted 22. Rule selection block 24 is a part of Correction Scheme block 14 as indicated pictorially by connection 25, and Grammar Marker and Grammer Marker Pattern block 26 is a part of Rule base 16 as indicated pictorially by connection 27.

As mentioned earlier, Chinese does not distinguish between pronoun cases, nor does it distinguish between singular and plural nouns. Moreover, Chinese includes no single-form verbs, no tense variations, no progressive mode, no passive voice verb forms, no variations for comparative adjectives and adverbs, no variations for superlative adjectives and adverbs, no definite article that is the equivalent of the English definite article "the," and no variations for the article "one." Thus, an important teaching of this invention is that when the Chinese sentence has been translated into a meaningful English sentence, said English sentence must be tested for the presence of passive voice verbs, for example, and other peculiarities of English not present in the original Chinese sentence. Upon detection of a passive voice verb, a comparative adjective, or the like in the translated sentence, such usage is tagged or identified by a grammar marker. Specifically, a numerical value is given to each grammar marker located in the translated, but not yet refined, sentence. A set of grammar rules is associated with each grammar marker and a set of self-correction rules is associated with each grammar marker pattern, and these rules are applied to produce the final, refined sentence. All rules are maintained in rule base 16.

More particularly, where Chinese is the source language and English is the target language, the following grammar markers are provided:

Pronoun Marker
    00 Pronoun case rules

01 Possessive as adjective
02 Possessive as noun
03 Objective case
04 Pronoun person rules
05 Present verb-to-be rules
06 Past verb-to-be rules
07 Present verb-to-have rules
08 Past verb-to-have rules
Plural noun Marker
  10 Plural noun conversion rules
Singular-Noun-Subject (SNS) Marker
  20 Singular-form verb conversion rules
  21 Present tense
  22 Past tense
Tense Marker
  30 Tense conversion rules, regular and irregular
  31 Present tense
  32 Past tense (including auxiliary verbs)
  33 Perfect tense
Progressive Mode Marker
  40 Present participle conversion rules
Passive Voice Marker
  50 Passive voice rules
  51 Present passive rules
  52 Past passive rules
  53 Present perfect passive rules
  54 Past perfect passive rules
Adverb Marker
  60 Adverb conversion rules
Comparative Mode Marker
  70 Comparative mode rules
  71 Comparative conversion rules
  72 Superlative conversion rules
Article Insertion And Correction Marker
  80 Article ONE correction rules
  81 Article THE correction rules
Preposition Usage Marker
  90 Preposition usage rules
  91 Noun followed by preposition rules
  92 Adjective and participle followed by preposition rules
  93 Verb followed by preposition rules
  94 Adverb followed by preposition rules The term "rules" in the above listing of grammar markers are hereinafter referred to as the grammar rules or GR.

The term "self-correction rules" (SCR) refers to the following rules:

1. If the GM and the GMP in raw translation 13 are PN(0x), x=1, 2, or 3, select the Pronoun case rules from rule base 16 and retrieve the appropriate pronoun to replace the PN in the raw sentence 13.
2. (a) If the GM and the GMP in raw translation 13 are PN+be (05/06), select the Pronoun person rule (05/06) from rule base 16 and retrieve the appropriate verb-to-be to replace the "be" in raw sentence 13.
   (b) If the GM and the GMP in raw translation 13 is PN+have(07/08), select the Pronoun person rule (07/08) from rule base 16 and retrieve the appropriate verb-to-have to replace the "have" in raw sentence 13.
3. If the GM and the GMP in raw sentence 13 is N(10), select the plural noun conversion rules from rule base 16 and retrieve the appropriate plural noun to replace the N in raw sentence 13.
4. If the GM and the GMP in raw sentence 13 is SNS(20)+V(21), select the singular-form verb rules from rule base 16 and retrieve the appropriate verb to replace the V in raw sentence 13.
5. If the GM and the GMP in raw sentence 13 is V(32), select the tense conversion rules from rule base 16 and retrieve the appropriate verb (past tense) from the regular and irregular verb table to replace the V in raw sentence 13.
6. If the GM and the GMP in raw sentence 13 is V(33), select the tense conversion rules from rule base 16 and retrieve the appropriate verb (perfect tense) to replace the V in raw sentence 13.
7. If the GM and the GMP in raw sentence 13 is V(40), select the Present participle conversion rules from rule base 16 and retrieve the appropriate present participle for V to replace the V in raw sentence 13.
8. (a) If the GM and the GMP in raw sentence 13 is AV (auxiliary verb)+be/have been+V(33), select the tense conversion rules from rule base 16 and retrieve the appropriate past participle to replace the V in raw sentence 13.
   (b) If the GM and the GMP in raw sentence 13 is PN be(05/06)+V(33), select the pronoun person rules (04) and the tense conversion rules 30 from rule base 16. Retrieve the appropriate verb-to-be and the appropriate past participle to replace the "be" and the verb V, respectively, in raw sentence 13.
   (c) If the GM and the GMP in raw sentence 13 is PN+have(07/08) been+V(33), select the pronoun person rules (04) and the tense conversion rules (30) from rule base 16. Retrieve the appropriate verb-to-have and the appropriate past participle to replace the "have" and the verb V, respectively, in raw sentence 13.
   (d) If the GM and the GMP in raw sentence 13 is N(10)+be(51/52)+V(33), apply Rule 3 and select the passive voice rules (50) and the tense conversion rules (30) from rule base 16. Retrieve the appropriate verb-to-be and the appropriate past participle to replace the "be" and the verb V, respectively, in raw sentence 13.
   (e) If the GM and the GMP in raw sentence 13 is N(10)+have been(53/54)+V(33), apply Rule 3 and select the passive voice rules (50) and the tense conversion rules (30) from rule base 16. Retrieve the appropriate verb-to-have and the appropriate past participle to replace the "have been" and the verb V, respectively, in raw sentence 13.
9. If the GM and the GMP in raw sentence 13 is A(60), select the adverb conversion rules from rule base 16 and retrieve the appropriate adverb to replace the adjective A in raw sentence 13.
10. If the GM and the GMP in raw sentence 13 is A(71), select the comparative mode conversion rules from rule base 16 and retrieve the appropriate comparative adjective to replace the adjective A in raw sentence 13.
11. If the GM and the GMP in raw sentence 13 is A(72), select the superlative mode conversion rules from rule base 16 and retrieve the appropriate superlative adjective to replace the adjective A in raw sentence 13.
12. If the GM and the GMP in the raw translation is ONE(80)+N/A, check the first letter of N or A.
    (a) If the first letter of the noun or noun phrase is a consonant, or if the first three letters are "uni," replace the "one" by "a" in raw sentence 13, excluding the exceptions.

(b) If the first letter of the noun is a vowel, replace "one" by "an" in raw sentence 13, excluding the exceptions.

Figure 3:
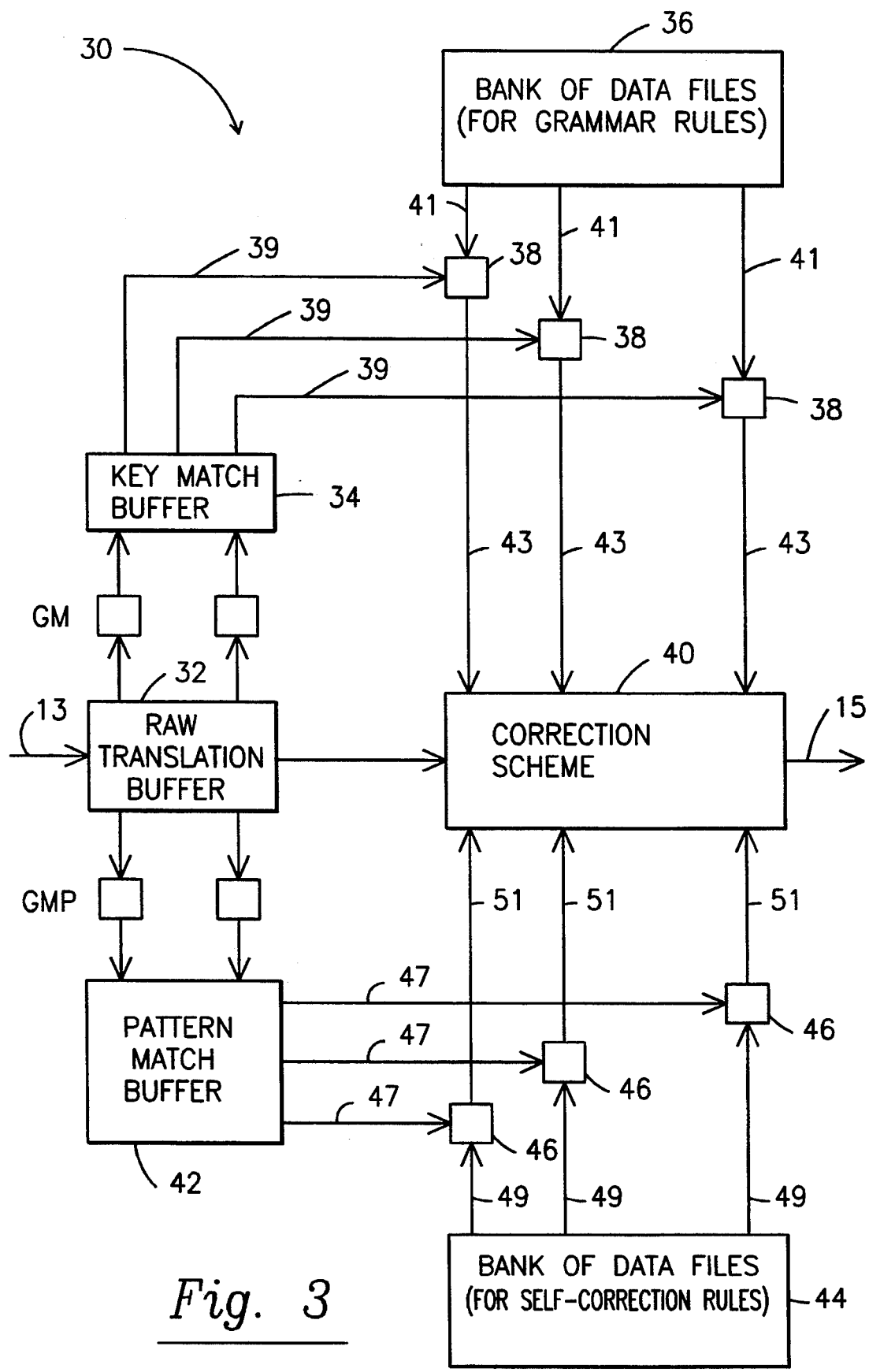
FIG. 3 is a more detailed block diagram of the self-correction system design of this invention.

The grammar self-correction process begins with the step of reading the grammar marker (GM) and the grammar marker pattern (GMP) from the raw sentence with grammatical errors therein into buffers 34 and 42 respectively, as shown in FIG. 3. The GMs and the GMPs are used to unlock rule base 16 of FIG. 2, or database 36 and database 44 of FIG. 3. The grammatically correct words are then retrieved and are substituted into the raw sentence.

A more detailed depiction of the system architecture is provided in FIG. 3, and is denoted 30 as a whole. Grammatically incorrect sentences 13 are input into Raw Translation (RT) buffer 32; these sentences include the grammar markers (GMs) and the grammar marker patterns (GMPs). The GMs and GMPs are then fetched from the RT buffer and input to Key Match (KM) buffer 34 and Pattern Match (PM) buffer 42, respectively. The GMs in KM buffer 34 activate the corresponding gates which control database 36. In other words, the GM from the KM buffer serves as a key to open the gate for the associated GR to be input to Correction Scheme 40. The GMs are used to bring out the necessary tools from the database 36 for making corrections. In like manner, the GMPs in PM buffer 42 activate the corresponding gates which control database 44. In other words, the GMP from the PM buffer serves as a key to open the gate for the associated SCR to be input to Correction Scheme 40. The GMPs are used to provide instructions for applying the GRs to make corrections.

Thus, it should be understood that the contents of KM buffer 34 and PM buffer 42 at this step of the novel method are GMs and GMPs, respectively, from the RT buffer 32. These GMs and GMPs are used as keys to open the appropriate gate 38 and gate 46, respectively.

It should also be understood that a GM is a tag for a GR, and a GMP is a tag for an SCR. Tags are used to retrieve the desired rules in the database.

The GMs open the desired gate 38, and the desired GR is allowed to pass through said gate to the Correction Scheme means 40. All of the gates between Correction Scheme 40 and database 36 are collectively denoted 38, but it should be understood that said gates are separate gates, as indicated by the lines respectively denoted 41 and 43. A gate is designed to control the flow of a specific rule to the Correction Scheme 40. Lines 39 enable KM 34 to reach said gates 38, lines 41 interconnect said database 36 and said gates, and the output lines 43 input the GRs into Correction Scheme means 40 when said gates 38 are opened by the aforesaid GMs from the KM buffer.

Next, the GMPs in the RT buffer 32 are fetched from said RT buffer 32 and are input into the Pattern Match (PM) buffer 42. The above-listed self-correction rules (SCRs) are stored in Bank of Data Files 44, hereinafter referred to as database 44; said SCRs are fetched from database 44 through enabled gates 46. When the content of PM buffer 42 opens the corresponding gate 46, the appropriate self-correction rule passes through the gate to Correction Scheme 40. Conductors 47 interconnect PM buffer 42 and said gates 46, conductors 49 interconnect database 44 and said gates, and the appropriate self-correction rule is input to Correction Scheme means 40 over conductors 51 when said gates 46 are opened by the GMPs from the PM buffer.

Thus, the contents of the Correction Scheme means 40 are now the grammar rules (GR) from database 36 and the self-correction rules (SCR) from database 44. (Again, both databases are in rule base 16). The SCRs execute the needed corrections and thus control operation of the Correction Scheme means 40, i.e., said SCRs tell said means 40 what to do and how to do it; the result is refined sentence 15, i.e., a grammatically correct sentence. In other words, the first database 36 provides the tools, i.e., the GRs, that are needed for making corrections. The second database 44 then provides the instructions for executing the needed corrections by applying the GRs and SCRs. The execution takes place in means 40. It should be understood, of course, that this division of databases is conceptual for the sake of facilitating explanation, i.e., both are in the hard disk of a computer means and are represented by rule base 16 in FIG. 2.

The following illustrative examples demonstrate how the Rules work:

| Illustrative Examples | |
|---|---|
| Mr. Wang (20) come (21) to visit he (03). | |
| Mr. Wang comes to visit him. | Rule 4 & Rule 1 |
| He buy (32) three book (10) yesterday. | Rule 5 & Rule 3 |
| He bought three books yesterday. | |
| This (20) be (21) he (01) book. | Rule 4 & Rule 1 |
| This is his book. | |
| He be (05) one (80) foreign student. | Rule 2a & Rule 12a |
| He is a foreign student. | |
| He eat (33) two peach (10). | Rule 6 & Rule 3 |
| He has eaten two peaches. | |
| He like (21) to read novel (10). | Rule 4 & Rule 3 |
| He likes to read novels. | |
| He have (21) leave (33) Taiwan. | Rule 4 & Rule 6 |
| He has left Taiwan. | |
| He be (21) sing (40). | Rule 4 & Rule 7 |
| He is singing. | |
| This task will be complete (33). | |
| This task will be completed. | Rule 8a |
| That fish be (52) eat (33) by one (80) white cat. | |
| That fish was eaten by a white cat. | Rule 8d & Rule 12a |
| He be (06) praise (33). | |
| He was praised. | Rule 8b |
| He have (08) been expel (33). | |
| He had been expelled. | Rule 2b & Rule 8c |
| This book be (52) take (33) by he (03) yesterday. | |
| This book was taken by him yesterday. | Rule 8d & Rule 1 |
| This cup have been (53) break (33) by he (03). | |
| This cup has been broken by him. | Rule 8c & Rule 1 |
| He run (10) quick (60). | |
| He runs quickly. | Rule 3 & Rule 9 |
| He be (05) tall (71) than his brother. | |
| He is taller than his brother. | Rule 2a & Rule 10 |
| He be (21) the old (72) in this group. | |
| He is the oldest in this group. | Rule 4 & Rule 11 |
| He see (32) one (80) American yesterday. | |
| He saw an American yesterday. | Rule 5 & Rule 12b |
| He see (32) one (80) snake in the garden. | |
| He saw a snake in the garden. | Rule 5 & Rule 12a |

Consider also the following example:
RT: This (20) be (21) he (01) book.
The GMs are 20, 21, 01, which are keys to open the gates to fetch GRs
  (01) possessive as adjective
  (20) singular-form verb conversion rules
  (21) present tense
The GMPs are SNS (20)+V (21), which is SCR 4, PN (Ox), which is SCR 1.

They are the keys to open the gates to fetch SRC 4 and SCR 1. These SCRs tell means 40 to use GR 20 and GR 21 to correct "be" to "is" and to use GR (01) to correct "he" to "his".

Thus, the self-correction scheme transforms

This be he book.

to

This is his book.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A method performed by a computer means for changing a grammatically incorrect sentence that has been pre-translated from a source language into a grammatically correct sentence in a target language, comprising the steps of:

storing a plurality of unique grammar markers in a first database and associating each unique grammar marker with a unique grammar rule;

storing a plurality of unique grammar marker patterns in a second database and associating each unique grammar marker pattern with a unique self-correction rule;

inputting a pre-translated sentence that may have grammatical errors therein into a raw translation buffer;

pre-identifying grammar markers in said pre-translated sentence, each grammar marker being associated with a word which may have grammatical variations in said target language but not in said source language;

scanning said pre-translated sentence to identify a grammar marker or a plurality of grammar markers, if any, and a grammar marker pattern or a plurality of grammar maker patterns, if any, in said pre-translated sentence;

providing a key match buffer for temporary storage of data;

inputting any identified grammar marker into said key match buffer;

providing a pattern match buffer for temporary storage of data;

inputting any identified grammar marker pattern into said pattern match buffer, providing a correction scheme means in said computer means for retrieving appropriate grammar rules and self-correction rules from said first and second databases, respectively, and for making appropriate corrections to generate a substantially grammatically correct sentence;

interconnecting a first plurality of logic gates between said correction scheme means and said first database and between said correction scheme means and said key match buffer;

comparing the grammar markers in the key match buffer with the grammar markers in the first database and opening said first plurality of logic gates when a match of grammar rules is made;

inputting grammar rules fetched from said first database into said correction scheme means when said first plurality of logic gates is enabled;

interconnecting a second plurality of logic gates between said correction scheme means and said second database and between said correction scheme means and said pattern match buffer;

comparing the grammar marker patterns in the pattern match buffer with the grammar marker patterns in the second database and opening said second plurality of logic gates when a match of self-correction rules is made;

inputting self-correction rules fetched from said second database into said correction scheme means when said second plurality of logic gates is enabled; and correcting said pre-translated sentence having grammatical errors therein by applying in said correction scheme means said fetched grammar rules and said fetched self-correction rules to said pre-translated sentence to produce a sentence substantially free of grammatical errors;

said fetched grammar rules and said fetched self-correction rules being appropriate rules to correct the pre-translated sentence because each grammar rule in said first database is associated with a unique grammar marker stored with it in said first database and because each self-correction rule in said second database is associated with a unique grammar marker pattern stored with it in said second database so that any grammar marker in said key match buffer will match only a counterpart grammar marker in said first database and therefore cause delivery of the grammar rule associated with said counterpart grammar marker in said first database to the correction scheme means, and so that any grammar marker in said pattern match buffer will match only a counterpart grammar marker pattern in said second database and therefore cause delivery of the self-correction rule associated with said counterpart grammar marker pattern in said second database to the correction scheme means;

whereby ungrammatical expressions in the pre-translated sentence are corrected in the absence of human intervention.

2. The method of claim 1, wherein a grammar marker of said plurality of grammar markers is a pronoun marker.

3. The method of claim 2, wherein said database for grammar marker rules includes pronoun case rules that apply when a possessive pronoun is used as an adjective, rules that apply when a possessive pronoun is used as a noun, rules that apply when a pronoun is used in an objective case, pronoun person rules, present verb-to-be rules, past verb-to-be rules, present verb-to-have rules, and past verb-to-have rules.

4. The method of claim 1, wherein a grammar marker of said plurality of grammar markers further includes a plural noun marker.

5. The method of claim 4, wherein said first database includes plural noun conversion rules.

6. The method of claim 1, wherein a grammar marker of said plurality of said grammar markers is a singular-noun-subject marker.

7. The method of claim 6 wherein said first database includes singular-form verb conversion rules, rules governing the use of a singular noun subject in the present tense, and rules governing use of a singular noun subject in past tense.

8. The method of claim 1, wherein a grammar marker of said plurality of grammar markers includes a tense marker.

9. The method of claim 8, wherein said first database includes regular and irregular tense conversion rules, rules governing use of present tense verbs, rules governing use of past tense verbs, including auxiliary verbs, and rules governing perfect tense verbs.

10. The method of claim 1, wherein a grammar marker of said plurality of grammar markers includes a progressive mode marker.

11. The method of claim 10, wherein said first database includes present participle conversion rules.

12. The method of claim 1, wherein a grammar marker of said plurality of said grammar markers includes a passive voice marker.

13. The method of claim 12, wherein said first database includes passive voice rules, present passive rules, past passive rules, present perfect passive rules, and past perfect passive rules.

14. The method of claim 1, wherein a grammar marker of said plurality of grammar marker includes an adverb marker.

15. The method of claim 14, wherein said first database includes adverb conversion rules.

16. The method of claim 1, wherein a grammar marker of said plurality of grammar markers includes a comparative mode marker.

17. The method of claim 16, wherein said first database includes comparative mode rules, comparative conversion rules, and superlative conversion rules.

18. The method of claim 1, wherein a grammar marker of said plurality of grammar markers includes an article insertion and correction marker.

19. The method of claim 18, wherein said first database includes article "one" correction rules and article "the" correction rules.

20. The method of claim 1, wherein a grammar marker of said plurality of grammar markers includes a preposition usage marker.

21. The method of claim 20, wherein said first database includes preposition usage rules, noun followed by preposition rules, adjective and participle followed by preposition rules, verb followed by preposition rules, and adverb followed by preposition rules.

22. The method of claim 1, further comprising the step of retrieving an appropriate pronoun to replace an inappropriate pronoun in the grammatically incorrect sentence by selecting pronoun case rules from said rule base if the grammar markers and the grammar marker pattern in said grammatically incorrect sentence is a possessive pronoun used as an adjective, a possessive pronoun used as a noun, or a pronoun in an objective case.

23. The method of claim 1, further comprising the step of retrieving an appropriate verb-to-be to replace a "be" in said grammatically incorrect sentence by selecting a pronoun person rule from said rule base if the grammar markers and the grammar marker pattern in said grammatically incorrect sentence is a pronoun plus "be".

24. The method of claim 1, further comprising the step of retrieving an appropriate verb-to-have to replace a "have" in said grammatically incorrect sentence by selecting a pronoun person rule from said rule base if the grammar markers and the grammar marker pattern in said grammatically incorrect sentence is a pronoun plus "have".

25. The method of claim 1, further comprising the step of retrieving an appropriate plural noun to replace a noun in said grammatically incorrect sentence by selecting plural noun conversion rules from said rule base if the grammar markers and the grammar marker pattern in said grammatically incorrect sentence is a plural noun marker.

26. The method of claim 1, further comprising the step of selecting singular-form verb rules from said rule base and retrieving an appropriate verb to replace a verb in said grammatically incorrect sentence if the grammar markers and the grammar marker patterns in said grammatically incorrect sentence include a singular noun subject marker plus a present tense verb.

27. The method of claim 1, further comprising the step of selecting tense conversion rules from said rule base and retrieving an appropriate past tense verb from a regular and irregular verb table to replace the verb in said grammatically incorrect sentence if the grammar markers and the grammar marker pattern in said grammatically incorrect sentence include a past tense verb.

28. The method of claim 1, further comprising the step of selecting tense conversion rules from said rule base and retrieving an appropriate perfect tense verb to replace the verb in said grammatically incorrect sentence if the grammar markers and the grammar marker pattern in said grammatically incorrect sentence include a perfect tense verb.

29. The method of claim 1, further comprising the step of selecting present participle conversion rules from said rule base and retrieving an appropriate present participle for a verb to replace the verb in said grammatically incorrect sentence if the grammar markers and the grammar marker pattern in said grammatically incorrect sentence includes a present participle verb.

30. The method of claim 1, comprising the step of selecting tense conversion rules from said rule base and retrieving an appropriate past participle to replace a verb in said grammatically incorrect sentence if the grammar markers and the grammar marker patterns in said grammatically incorrect sentence include an auxiliary verb plus be/have been plus a perfect tense verb.

31. The method of claim 1, further comprising the step of selecting pronoun person rules and tense conversion rules from said rule base and retrieving an appropriate verb-to-be and an appropriate past participle to replace the "be" and the verb, respectively, in said grammatically incorrect sentence, if the grammar markers and the grammar marker patterns in said grammatically incorrect sentence include a pronoun plus "be" plus a perfect tense verb.

32. The method of claim 1, further comprising the step of selecting pronoun person rules and tense conversion rules from said rule base and retrieving an appropriate verb-to-have and an appropriate past participle to replace the "have" and the verb, respectively, in said grammatically incorrect sentence, if the grammar markers and the grammar marker pattern in said grammatically incorrect sentence include a pronoun plus "have been" plus a perfect tense verb.

33. The method of claim 1, further comprising the step of selecting plural noun conversion rules from said first database and retrieving an appropriate plural noun to replace the noun said grammatically incorrect sentence and selecting passive voice rules and tense conversion rules from said first database and retrieving an appropriate verb-to-be and an appropriate past participle to replace the "be" and the verb, respectively, in said grammatically incorrect sentence, if the grammar markers and the grammar marker pattern in said grammatically incorrect sentence include a plural noun plus "be" plus a perfect tense verb.

34. The method of claim 1, further comprising the step of selecting plural noun conversion rules from said first database and retrieving an appropriate plural noun to replace the noun in said grammatically incorrect sentence and selecting passive voice rules and tense conversion rules from said first database and retrieving an appropriate verb-to-have and an appropriate past participle to replace the "have been" and the verb, respectively, in said grammatically incorrect sentence, if the grammar markers and the grammar marker pattern in said grammatically incorrect sentence include a plural noun plus "have been" plus a perfect tense verb.

35. The method of claim 1, further comprising the step of selecting adverb conversion rules from said rule base and retrieving an appropriate adverb to replace an adverb in said grammatically incorrect sentence if the grammar markers and the grammar marker pattern in said grammatically incorrect sentence include an adverb.

36. The method of claim 1, further comprising the step of selecting comparative mode conversion rules from said rule base and retrieving an appropriate comparative adjective to replace the adjective in said grammatically incorrect sentence if the grammar markers and the grammar marker pattern in said grammatically incorrect sentence includes a comparative adjective.

37. The method of claim 1, further comprising the step of selecting superlative mode conversion rules from said rule base and retrieving an appropriate superlative adjective to replace the adjective in said grammatically incorrect sentence if the grammar markers and the grammar marker pattern in said grammatically incorrect sentence is a superlative adjective.

38. The method of claim 1, further comprising the step of checking the first letter of a noun or adjective if the grammar marker and the grammar marker pattern in said grammatically incorrect sentence is "one" plus a noun or an adjective.

39. The method of claim 1, further comprising the step of replacing a "one" in said pre-translated sentence by an "a" if the first letter of a noun or noun phrase is a consonant, or if the first three letters of said noun or noun phrase are "uni."

40. The method of claim 39, further comprising the step of replacing "one" by "an" in said grammatically incorrect sentence if the first letter of the noun is a vowel.

* * * * *